Dec. 12, 1939.   E. S. MASON   2,183,026
FEED CONTROL
Filed Oct. 15, 1936   2 Sheets-Sheet 1

INVENTOR.
Erwin S. Mason
BY
   ATTORNEYS

Patented Dec. 12, 1939

2,183,026

UNITED STATES PATENT OFFICE 2,183,026

FEED CONTROL

Erwin S. Mason, Norwood, Ohio, assignor to The J. H. Day Company, Cincinnati, Ohio, a corporation of Ohio Application October 15, 1936, Serial No. 105,755

10 Claims. (Cl. 221—118)

This invention relates to a feed control such as may be employed in effecting a desired automatic release of materials from a hopper, chute, or other source of supply.

An object of the invention is to provide for an entirely automatic release of material or substance from a source of supply to a receiving means, at a rate commensurate with a demand that may vary under certain circumstances, or that may cease entirely at intervals.

Another object of the invention is to provide means for the purpose stated, which is rendered entirely automatic, highly dependable, and free of complicated mechanism, by the utilization of photo-electric means, or the so-called electric eye.

A further object of the invention is to provide a means of the character stated, which will enable a machine operator to devote his entire time to the operation of a machine exclusive of the feed, thereby to increase production and preserve the continuity thereof.

The foregoing and other objects are attained by the means described herein and disclosed in the accompanying drawings, in which.

Figure 1:
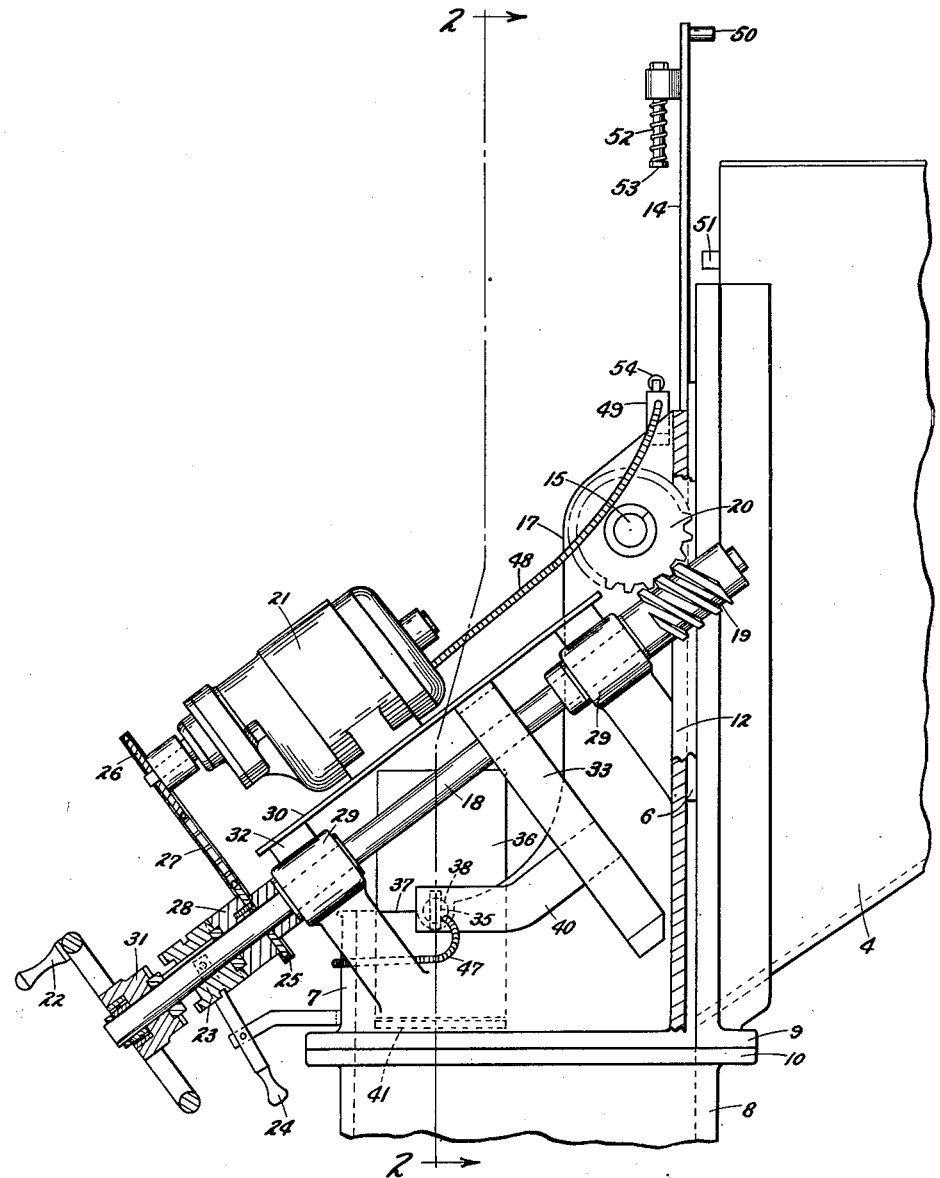
Fig. 1 is a fragmental side elevational view of an automatic feed or release mechanism embodying the present invention.

The invention as herein presented deals with the feeding of a plastic mass, such as dough, from a source of supply to a machine which molds or divides the mass into individual lumps, or otherwise operates upon and carries the mass either continuously or intermittently from the source of supply. While it may be possible to embody the invention in mechanisms for handling other kinds of materials or substances, the arrangement herein disclosed is particularly adapted for the handling or control of plastic or semi-solid substances, for example, dough, as used in making bread and other bakery products. It is in this capacity that the invention is particularly useful and most desirable, so far as is now known.

With reference to the accompanying drawings, the character 4 indicates a chute or source of supply for plastic substance, having an opening 5 in its forward portion, to be closed by means of a reciprocable gate 6. When the gate is open, as shown, plastic substance from the chute or source of supply is prompted to advance or extrude into an adjacent receiving bin 7 which, in the present embodiment, is in the nature of a rectangular open frame having vertical sides for guiding the substance or material vertically downwardly into a hopper 8 of a plastic working machine which either consumes or advances the substance continuously or in an intermittent manner, depending upon the character of such machine. Accordingly, the hopper 8 may be the intake of a dough divider or an equivalent mechanism requiring a feed of plastic from a source such as 4. For the details of a dough divider, reference may be had to the W. G. Kirchhoff patent, No. 2,001,026, dated May 14, 1935. Said patent shows at 15 a hopper corresponding to hopper 8 herein. The flanged bottom 9 of the receiving bin is adapted to coincide with the flanged upper rim 10 of the hopper 8.

The reciprocating gate 6 is adapted to be elevated or lowered for varying the size of the chute opening 5, the operation of the gate being such that the bin 7 will never be exhausted of its contents so long as a reserve is maintained in the chute or source of supply 4. The gate is guided in its vertical reciprocatory movement by means of suitable side channels or guide members 12, as a pinion 13 is rotated to elevate and lower a cooperative engaging rack 14 which is fixed relative to the gate. The pinion preferably is fixed upon a cross shaft 15 journalled at its ends in suitable bearings 16 carried by the frame of the device, which frame may be in the form of upwardly extended sides 17 of the bin 7. The shaft 15 is adapted to be rotated by means of a gear train adapted to transmit power to the pinion if and when rotational movement is imparted to the gate operating shaft 18. The gear train mentioned may be in the form of a worm 19 fixed upon shaft 18 and arranged in operating engagement with a worm wheel 20 that is fixed upon one end of the cross shaft 15. The gate operating shaft may be rotated selectively by a torque motor 21, or a suitable type of reversible motor or, if desired, by the use of an actuator 22 to be manipulated by hand. The selection of power manipulation or hand operation of the gate operating shaft may be made by the use of a clutch 23 provided with any suitable engaging and disengaging means such as a handle 24. It is believed unnecessary to describe in detail the operation of the clutch, as it may be simply an ordinary dog clutch capable of movement to one position for fixing the sprocket 25 relative to shaft 18, and to a second position at which the actuator 22 is operatively connected with said shaft for rotating it by means of the actuator 22. The sprocket 25 is operatively connected to a sprocket on the shaft of motor 21, by means of a chain 27, this arrangement furnishing one of a number of satisfactory power transmission means between the clutch part 28 and the shaft of the reversible motor.

From the foregoing, it will readily be understood that by supplying electricity to the motor 21 so as to rotate the shaft thereof in forward or reverse directions of rotation, the gate 6 will be elevated and lowered by means of the rack and pinion arrangement, for the purpose of adjusting the size of opening through which plastic substance may extrude or be released from the source of supply indicated at 4. The characters 29 indicate suitable stationary bearings for the gate operating shaft 18, whereas 30 indicates a mounting plate for the motor. It will be understood that the same character of gate movement may be accomplished manually by de-clutching the motor drive, and engaging the clutch parts 23 and 31 by means of the clutch shift handle 24. The motor mounting plate may be supported upon suitable braces 32 and 33.

In the normal operation of the device, the opening and closing movements of the gate are entirely automatic, and are governed by the demand for material imposed by the machine whose hopper is indicated at 8. For this purpose, a photo-electric apparatus is employed, the operation of said apparatus being controlled by subjecting its exciter beam to interception by the dough mass when the mass reaches a predetermined height in the receiving bin 7. In the present embodiment, the gate is lowered or closed just prior to an overflow of the dough mass in the receiving bin 7, so that the character and behavior of the dough may always be under observation, it being understood that the bin is necessarily located well above the floor line and at substantially the sighting level of an operator in standing position.

Figure 2:
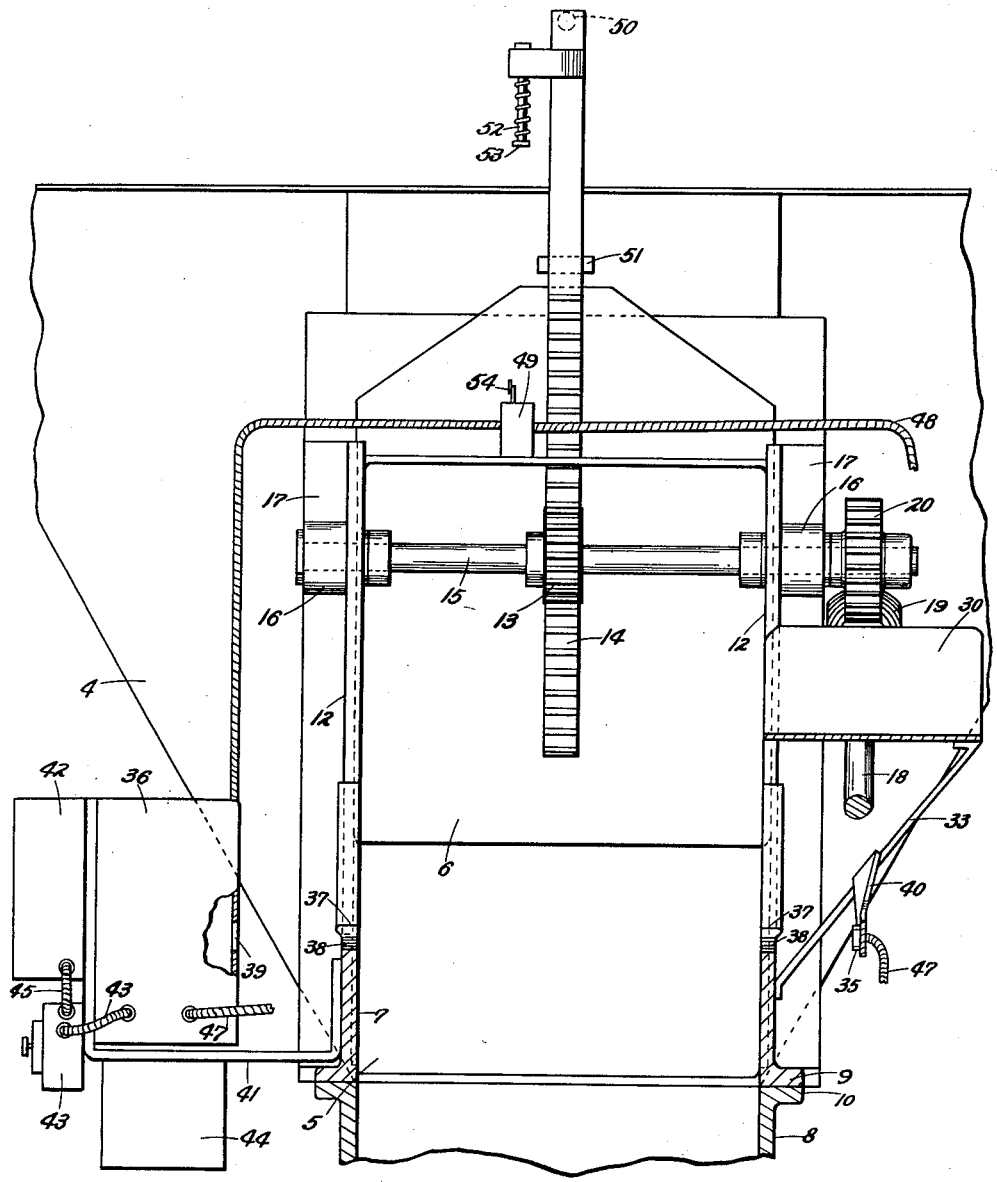
Fig. 2 is a fragmental cross-sectional view of the Fig. 1 device, taken on line 2—2 of Fig. 1.

Reverting now to the illustrations, and particularly to Fig. 2, 35 indicates an exciter lamp for a photo-electric cell contained within the housing 36 (but not shown), these elements being arranged so that the exciter beam from the lamp is projected across the lowermost portion of the upper edge of the receiving bin, in substantial perpendicularity to the direction of gate travel. In the present instance, the upper edges 37 of the receiving bin are notched as at 38 to permit projection of the beam from the exciter lamp to and through an aperture 39 in the housing 36 of the cell to be acted upon by the beam. The lamp may be suitably supported upon a bracket or the like 40 at one end of the receiving bin, while a bracket or support 41 provides a mounting for the housing 36, a motor starter 42, and a switch box 43. The housing shown at 44 contains parts of the photo-electric control means which are not included in the housing 36. Inasmuch as the photo-electric control means is a purchasable article, and its mode of connection with switches and power lines is well known, the present description need not be burdened with the details thereof. It may be observed that all the wiring is enclosed in conduits or cables, of which those indicated at 45, 46, 47, and 48 contain the necessary conductors whereby the closing of an electrical circuit of the photo-electric cell, by means of the beam from the exciter lamp, will energize the motor 21 and cause it to drive the gate operating shaft 18 for elevating or opening the gate 6. Thereupon, the plastic material enters the receiving pin 7, and when the mass reaches the proper height for intercepting the exciter beam, the motor circuit is reversed so as to initiate a closing movement of the gate, thereby to limit or terminate completely the flow of substance from the chute or source of supply 4. Included in the motor circuit also is an electrical switch 49, referred to as a limit switch, for breaking the circuit of the electrical motor in the event that the gate closes completely and is stopped by means of the cooperative limit stops 50 and 51 carried by the rack 14 and the frame of the machine, respectively. The limit switch actuator is shown at 52, and may comprise a spring supported plunger 53 arranged on the rack in line with the trip 54 of the limit switch, so that the motor will be de-energized and prevented from causing injury to the working parts in the event that the gate closes completely, with the fixed stops 50 and 51 in contact.

In the normal operation of the device, the plastic substance from the source of supply or chute 4 is released into the receiving bin, as the gate, under the influence of the controlled motor 21, reciprocates more or less depending upon the height of the plastic in the bin, and the length of time required to restore the normal maximum height thereof. It is important to note that the device of the invention is without means for adjusting it to handle or control plastics of various consistencies. No re-setting or adjusting is required when the device is used for heavy-bodies or light-bodied plastics, for the reason that the slower and faster movements, respectively, of such substances have a certain controlling influence upon the extent of travel of the gate. For example, it will readily be evident that the gate will open wider or stay open longer to insure the required feed when the plastic mass is heavy-bodied, due to an increase in the length of time required for that character of mass to fill the bin. When the bin is filled, the exciter beam is intercepted to effect a reversal of the motor for lowering or closing the gate, and as the heavy-bodied mass is slow to move, the gate will close or partly close for a longer period of time than in the control of lighter bodied masses. A more fluid plastic is just as effectively controlled, without alteration of adjustments, for in the control of plastics which flow more freely, the travel of the gate is correspondingly reduced, automatically. That is, the gate may not normally have the opportunity to open widely because of the shorter time period required for a more fluid plastic to fill the bin. This is a distinct advantage of the present invention.

As different installations may necessarily vary under certain circumstances, it is to be understood that various modifications and changes in the structural details of the device may be made, within the scope of the appended claims, without departing from the spirit of the invention.

What is claimed is:

1. The combination of a source of supply for plastic substance, including a chute having a feed opening near its lower end, a substance-delivering receiving bin to be kept charged with plastic, and located adjacent to said opening and having a substance releasing outlet, and an inlet for receiving substance released from the source of supply, a gate for controlling the release of substance from the source of supply and into the bin as the bin requires replenishing, and means operating according to variations in the quantity of substance in the bin for varying the gate opening to maintain a substantial quantity of substance in the receiving bin, said means comprising a gate actuating mechanism including an electrical motor and a photo-electric apparatus for reversing the direction of rotation of the motor, and the opening and closing movements of the gate.

2. In combination, a gravity chute serving as a source of supply for plastic substance, said chute having a feeding opening near its lower end, a gate reciprocable across the opening to vary the size thereof, a substance-delivering receiving bin having an open top located alongside of the chute opening and exteriorly of the gate for receiving plastic substance released by the gate through the chute opening, a motor and gearing associated therewith for reciprocating the gate to vary the feed opening of the chute, a photo-electric cell at one side of the receiving bin, and an exciter lamp at the opposite side thereof to project a beam across the bin and into the cell, the height of the beam being such as to be intercepted by the plastic substance before overflowing the sides of the bin, and electrical circuit means including the motor, the cell, and the exciter lamp, for effecting a reversal of reciprocating gate movement upon interception of the exciter lamp beam by the accumulated mass in the bin.

3. In combination, a gravity chute serving as a source of supply for plastic substance, said chute having a feeding opening near its lower end a gate reciprocable across the opening to vary the size thereof, a substance-delivering receiving bin having an open top located alongside of the chute opening and exteriorly of the gate for receiving plastic substance released by the gate through the chute opening, a motor and gearing associated therewith for reciprocating the gate to vary the feed opening of the chute, a photo-electric cell at one side of the receiving bin, and an exciter lamp at the opposite side thereof to project a beam across the bin and into the cell, the height of the beam being such as to be intercepted by the plastic substance before overflowing the sides of the bin, electrical circuit means including the motor, the cell, and the exciter lamp, for effecting a reversal of reciprocating gate movement upon interception of the exciter lamp beam by the accumulated mass in the bin, and a safety means for de-energizing the motor upon movement of the gate to a limit of reciprocation.

4. In combination, a gravity chute serving as a source of supply for plastic substance, said chute having a feeding opening near its lower end, a gate reciprocable across the opening to vary the size thereof, a substance-delivering receiving bin having an open top located alongside of the chute opening and exteriorly of the gate for receiving plastic substance released by the gate through the chute opening, a motor and gearing associated therewith for reciprocating the gate to vary the feed opening of the chute, a photo-electric cell at one side of the receiving bin, and an exciter lamp at the opposite side thereof to project a beam across the bin and into the cell, the height of the beam being such as to be intercepted by the plastic substance before overflowing the sides of the bin, electrical circuit means including the motor, the cell, and the exciter lamp, for effecting a reversal of reciprocating gate movement upon interception of the exciter lamp beam by the accumulated mass in the bin, stop means for limiting reciprocation of the gate in one direction of its travel, and means in the form of an electricity cut-off switch included in the motor circuit, for de-energizing the motor prior to the operation of the stop means of the gate.

5. The combination of a gravity supply means having an opening therein for feeding plastic substance, a gate reciprocable across the opening to vary the size thereof, a substance-delivering receiving bin in the form of a frame having upright walls located exteriorly of the chute in close proximity to the feeding opening, for receiving and supporting therein a quantity of plastic substance released by the supply means, the bin being arranged to accumulate a quantity of the substance so that the level thereof rises to and beyond the tops of the bin walls for inspection and observation, means for casting a beam across the top of the bin, to be intercepted by said accumulated mass of plastic substance, and means responding to intercepted and uninterrupted conditions of the beam for moving the gate to vary the size of the feeding opening as the level of plastic substance changes in the receiving bin.

6. The combination of a gravity supply means having an opening therein for feeding plastic substance, a gate reciprocable across the opening to vary the size thereof, a substance-delivering receiving bin in the form of a frame having upright walls located exteriorly of the chute in close proximity to the feeding opening, for receiving and supporting therein a quantity of plastic substance released by the supply means, the bin being arranged to accumulate a quantity of the substance so that the level thereof rises to and beyond the tops of the bin walls for inspection and observation, means for casting a beam across the top of the bin, to be intercepted by said accumulated mass of plastic substance, means responding to intercepted and uninterrupted conditions of the beam for moving the gate to vary the size of the feeding opening as the level of plastic substance changes in the receiving bin, and means for accepting from the receiving bin the substance fed thereto through the supply means opening.

7. In a system of bakery equipment, the combination of a plastic dough supply means having a variable opening for the feeding of dough from a mixing station, a hopper forming part of a dough working machine for reception of dough delivered through the opening, and means for correlating the rate of dough feed to the demand of the dough working machine, comprising a receiving bin in the form of a frame having an upright opening therethrough, the bottom of the opening being in coincidence with the hopper of the dough working machine, and the top of the opening being accessible for receiving dough fed from the supply means through the opening thereof, and mechanism including photo-electric means controlled by a changing level of dough in the bin, for effecting variations in the size of the dough feeding opening in accordance with the demand of the dough working machine.

8. In a system of bakery equipment, the combination of a plastic dough supply means having an opening for the feeding of dough from a mixing station, a gate reciprocable across said opening to vary the discharging rate of the dough therefrom, a hopper forming part of a dough working machine for reception of dough delivered through the gate opening, and means for correlating the rate of dough feed to the demand of the dough working machine, comprising a receiving bin in the form of a frame having an upright opening therethrough, the bottom of the opening registering with the hopper of the dough working machine, and the top of the opening being accessible for receiving dough fed from the supply means through the gate opening thereof, and including a gate actuating motor controlled by changes in the level of dough occurring in the bin as the dough is fed into the top thereof by the supply means and accepted from the bottom thereof by the dough working machine.

9. In a system of bakery equipment, the combination of a plastic dough supply means having an opening for the feeding of dough from a mixing station, a gate reciprocable across said opening to vary the discharging rate of the dough therefrom, a motor including means for moving the gate toward the opened and closed positions, a hopper forming part of a dough divider for reception of dough delivered through the gate opening, and means for correlating the rate of dough feed to the demand of the dough divider, comprising a receiving bin in the form of a frame having an upright opening therethrough, the bottom of the opening registering with the hopper of the dough divider, and the top of the opening being accessible for receiving dough fed from the supply means through the gate opening thereof, a photo-electric cell at one side of the receiving bin, and a cell exciter at the opposite side thereof to project a beam across the bin and into the cell, the height of the beam being such as to be intercepted by an accumulation of dough in the bin before overflowing the sides thereof, and electrical circuit means including the cell, the exciter, and the motor, for effecting a closing movement of the gate upon each interception of the exciter beam by an accumulated mass of dough in the bin.

10. In a system of bakery equipment, the combination of a plastic dough supply means having an opening for the feeding of dough from a mixing station, a gate reciprocable across said opening to vary the discharging rate of the dough therefrom, a motor including means for moving the gate toward the opened and closed positions, a hopper forming part of a dough divider for reception of dough delivered through the gate opening, and means for correlating the rate of dough feed to the demand of the dough divider, comprising a receiving bin in the form of a frame having an opening registering with the hopper of the dough divider, and a second opening accessible for receiving dough fed from the supply means through the gate opening thereof, a photo-electric cell at one side of the receiving bin, and a cell exciter at the opposite side thereof to project a beam across the bin and into the cell, the height of the beam being such as to be intercepted by an accumulation of dough in the bin rising to a predetermined height, and electrical circuit means including the cell, the exciter, and the motor, for effecting a closing movement of the gate upon each interception of the exciter beam by such accumulated mass of dough in the bin.

ERWIN S. MASON.